United States Patent [19]

Carl et al.

[11] Patent Number: 5,117,661
[45] Date of Patent: Jun. 2, 1992

[54] DISK DRIVE LOCK

[75] Inventors: Stewart R. Carl, Palo Alto; Alice M. Kasahara, Oakland; Arthur H. Zarnowitz, Burlingame, all of Calif.

[73] Assignee: Kensington Microwave Limited, San Mateo, Calif.

[21] Appl. No.: 738,660

[22] Filed: Jul. 31, 1991

[51] Int. Cl.⁵ .................. E05B 55/00; E05B 65/00; B65D 55/14
[52] U.S. Cl. ........................................ 70/14; 70/58; 70/158; 70/163
[58] Field of Search ............. 70/57, 58, 163, 164, 70/14; 292/175, 153, 174; 360/137; 369/292

[56] References Cited

U.S. PATENT DOCUMENTS

| | | |
|---|---|---|
| 1,452,471 | 4/1923 | Kline . |
| 2,594,012 | 4/1952 | Griffin ................................ 220/55 |
| 2,800,090 | 7/1957 | Reid .................................. 109/59 |
| 3,055,204 | 9/1962 | Pelcin ............................... 292/174 |
| 3,276,835 | 10/1966 | Hall .................................. 312/333 |
| 3,469,874 | 9/1969 | Mercurio . |
| 4,131,001 | 12/1978 | Gotto . |
| 4,527,405 | 7/1985 | Renick . |
| 4,584,856 | 4/1986 | Petersdorff . |
| 4,640,106 | 2/1987 | Derman . |
| 4,655,057 | 4/1987 | Derman . |
| 4,685,312 | 8/1987 | Lakoski . |
| 4,856,304 | 8/1989 | Derman . |
| 4,908,728 | 3/1990 | Pinkett ............................. 70/163 |
| 4,918,952 | 4/1990 | Lakoski . |
| 4,959,979 | 10/1990 | Filipow . |
| 5,022,242 | 6/1991 | Povilaitis ........................... 70/58 |

FOREIGN PATENT DOCUMENTS 1206121 9/1970 United Kingdom ............... 292/175
2131219 6/1984 United Kingdom ................ 70/58

OTHER PUBLICATIONS

*Computer and Office Equipment Security Catalog*, ©1990 by Secure-It, Inc., 18 Maple Court, East Longmeadow, Mass. 01028.

Primary Examiner—Renee S. Luebke
Assistant Examiner—Darnell M. Boucher
Attorney, Agent, or Firm—Townsend and Townsend

[57] ABSTRACT

Apparatus for preventing unwanted access to a disk drive is disclosed. A housing has a surface adapted to overlie the slot, an internal piston chamber extending inwardly from one end of the housing, and a lock receiving chamber intersecting the piston chamber immediate the ends of the housing. A fixed latch member extends outwardly from one end of the housing, and is provided with a lip at its distal end. A movable latch member is attached to a piston located in the piston chamber and projects outwardly parallel to the fixed latch member. The movable latch member has a lip at its distal end extending outwardly so that the lips of the respective latch member extend away from one another. The piston is movable inwardly with respect to the housing so that the latch members can be inserted into the disk drive slot, and thereafter the piston moves outwardly so that the lips of the latch members engage the corners of the slot. A lock mechanism is located in the lock receiving chamber of the housing. The lock mechanism has a hasp movable from an unlocking position and a locking position which locks the latch members in engagement with the slot.

14 Claims, 2 Drawing Sheets

DISK DRIVE LOCK

BACKGROUND OF THE INVENTION

The present invention relates to apparatus for preventing access to a floppy disk drive in a computer As the use of personal computers proliferates in everyday business and personal life, and as the population becomes more computer literate, the need for computer security becomes more and more significant. Personal computers are often situated in physical locations where access cannot be completely controlled. In the past, sensitive information was typically stored in a filing cabinet which could be locked when the custodian was absent. When computers initially became prevalent, they were large machines housed in separate rooms and accessible only to those with specialized knowledge—security was more or less inherent. Now, sensitive information is typically resident in the hard disk of a desk top computer, such computers can be accessed by many people with knowledge of standard computer software, and the security of such information is more difficult to maintain. Indeed, the problem is more acute in the personal computer environment because information on the hard disk can be copied wholesale onto a floppy disk in seconds, and the breach of security is not apparent to the authorized users of the computer. The fact that the breach of security is not apparent to the authorized user is often more of a problem than the actual taking of the information by one who is unauthorized.

Various approaches have been attempted to maintain computer security, and in particular to prevent unauthorized access to a computer through its floppy disk drive. A relatively straightforward approach is illustrated in U.S. Pat. No. 4,918,952, in which a locking mechanism is formed as an integral part of the disk drive. However, this approach requires the computer itself to be custom tailored to accommodate the security device. Another approach is illustrated in U.S. Pat. No. 4,907,111, in which a special dummy disk is inserted, and a second member is affixed to the dummy disk to prevent access to the disk drive. However, this approach requires two relatively bulky members to provide security, and that a mechanism to be inserted into the delicate read/write mechanism of the drive.

Various devices have been recently introduced in which a simple locking mechanism is secured to the inside surface of the slot which provides access to the disk drive. Typically, such devices have tabs on either end so that the device cannot slip to one side or the other, plus a central locking mechanism, much like that shown in U.S. Pat. No. 4,918,952, but located on the device itself. The locking mechanism has a hasp which rotates from a horizontal position for insertion of the lock to a vertical position in which the hasp engages the inside surface of the slot and prevents access to the disk drive. Devices of this type require that the locking hasp be inserted directly into the drive, however, and such devices are not adaptable to certain types of disk drives.

SUMMARY OF THE INVENTION

Apparatus for preventing unwanted access to a disk drive adaptable to a wide variety of disk drive slot configurations is disclosed. A housing is provided which has a surface adapted to overlie the slot. The housing has an internal piston chamber extending inwardly from one end of the housing and a lock receiving chamber intersecting the piston chamber immediate the ends of the housing. A fixed latch member extends outwardly from one end of the housing, and is provided with a lip at its distal end. A movable latch member is attached to a piston located in the piston chamber and projects outwardly parallel to the fixed latch member. The movable latch member has a lip at its distal end extending outwardly so that the lips of the respective latch members extend away from one another. The piston is movable inwardly with respect to the housing so that the latch members can be inserted into the disk drive slot, and thereafter the piston moves outwardly so that the lips of the latch members engage the corners of the slot. A lock mechanism is located in the lock receiving chamber of the housing. The lock mechanism has a hasp movable from an unlocking position which allows the piston to be moved inwardly, and a locking position which prevents inward movement of the piston and thus locks the latch members in engagement with the slot.

The apparatus of the present invention does not require that the locking mechanism itself extend into the slot. Rather, the latch members at the opposite ends of the housing are the sole elements of the device which must move into the slot, making the device adaptable to a wide variety of floppy disk drive configurations, including standard 3¼" and 5¼" drives. Assuming that the lock mechanism itself is not defeated, the apparatus of the present invention prevents access to a computer floppy disk drive without serious and visible damage to the computer.

The novel features which are characteristic of the invention, as to organization and method of operation, together with further objects and advantages thereof will be better understood from the following description considered in connection with the accompanying drawings in which a preferred embodiment of the invention is illustrated by way of example. It is to be expressly understood, however, that the drawings are for the purpose of illustration and description only and are not intended as a definition of the limits of the invention.

DESCRIPTION OF THE PREFERRED EMBODIMENT

Figure 1:
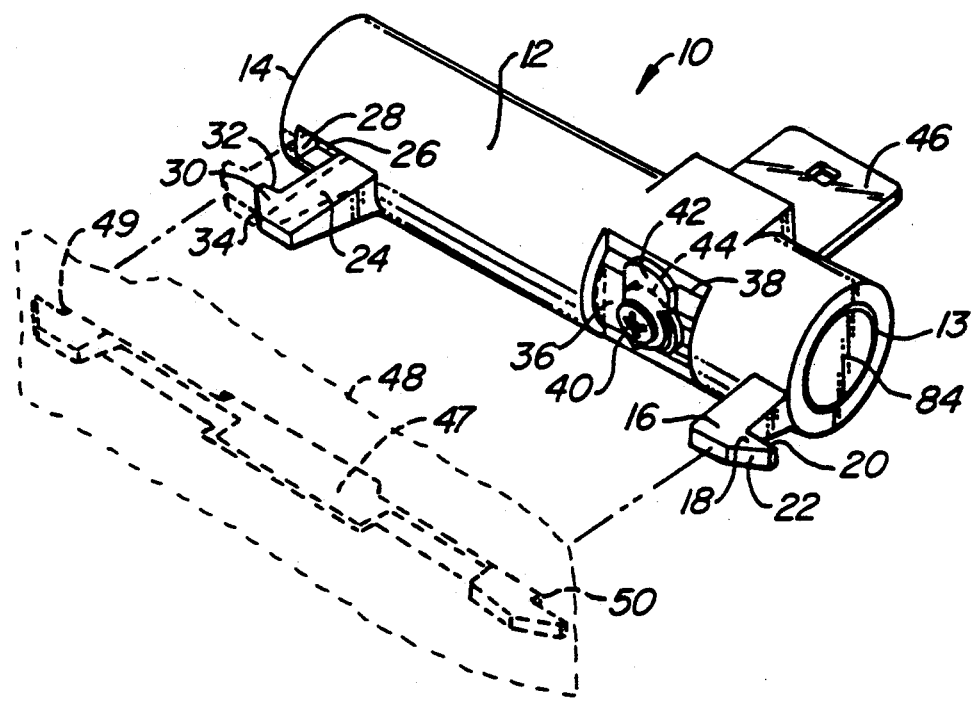
FIG. 1 is a perspective view of the preferred embodiment of the present invention.

The preferred embodiment 10 of the present invention is illustrated generally by way of reference to FIG. 1. An elongate housing 12 having a generally cylindrical exterior and a hollow interior has open ends 13 and 14. A fixed latch member 16 projects outwardly from housing 12 near end 13 in a direction generally perpendicular to the axis of the housing. A lip 18 projects laterally outwardly from the distal end of fixed latch member 16 Lip 18 has a surface 20 on the side of the lip facing housing 12, and an angled surface 22 on the opposite side of the lip.

A movable latch member 24 projects outwardly from a cylindrical piston 26 located within housing 12 through a radial aperture 28 formed in the housing. Movable latch member 24 has a lip 30 projecting outwardly and laterally with respect to housing 12. Lip 30 has an underlying surface 32 facing housing 12 and an angled surface 34 on the opposite side of the lip.

Piston 26 includes an extension 36 which extends into a chamber 38 in housing 12 containing a locking mechanism 40. Locking mechanism 40 has an elongate hasp 42 rotatable back and forth throughout a 90° arc (see arrow 44) by a removable key 46. In the position illustrated by solid lines in FIG. 1, hasp 42 has its short dimension aligned with piston 26. This position of hasp 42 allows the piston to move inwardly with respect to the housing 12 so that piston latch member 24 is moved closer to fixed latch member 16. When hasp 42 is rotated so that its long dimension is aligned with piston 26, piston extension 36 is forced outwardly with respect to housing 12. With hasp 42 in this latter position, piston latch member 24 and attached angled surface 34 is forced outwardly with respect to housing 12, as illustrated by dashed lines in FIG. 1.

A conventional disk drive slot 47 formed in a disk drive bezel 48 is illustrated with dashed lines in FIG. 1. Slot 47 has opposite rectangular corners 49, 50. Bezel 48 is typical of the floppy disk drives found in many computers, including 5¼" and 3¼" floppy drives, in which disks are adapted to be inserted into and removed from the computer disk drive by the user. Embodiment 10 has been configured so that the distance between the outer edges of the lips 18, 30 on the respective latching members 16, 24 with piston 26 retracted is slightly less than the distance between the corners 49, 50 of the disk drive slot 47 of the computer to which the device is to be inserted. After the latch members have been inserted into slot 47, piston 26 is moved outwardly so that the lips 18, 30 of latch members 16, 24 engage the corners 49, 50 of slot 47. Key 46 is then rotated 90° so that the long dimension of hasp member 42 lines up with piston 26, locking the piston in its outwardly extended position and locking housing 12 in slot 47. In the engaged position, the surface of housing 12 between latch members 16, 24 will overlie slot 47 and prevent access to the disk drive. Lock mechanism 40 is of a type which is highly resistant to tampering and the device cannot be removed without ripping out the corners of slot 47, which is difficult and leaves the computer obviously damaged.

Figure 2A:
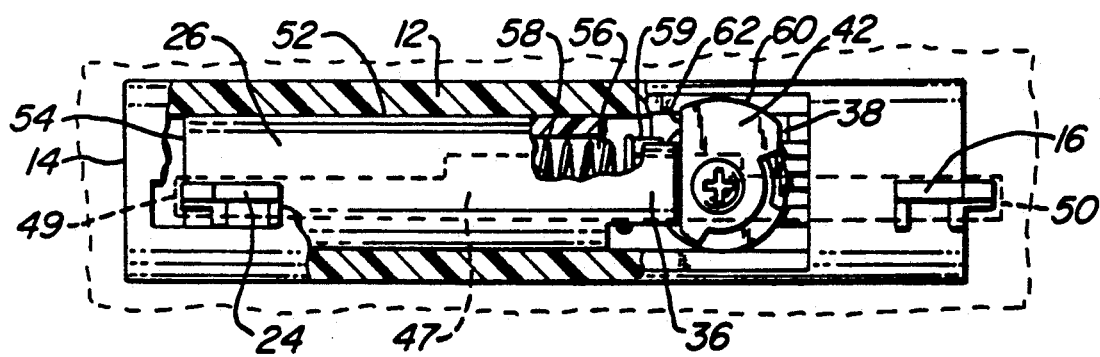
FIG. 2A is an elevation view of the embodiment of FIG. 1 in the unlocking position with portions broken away.
Figure 2B:
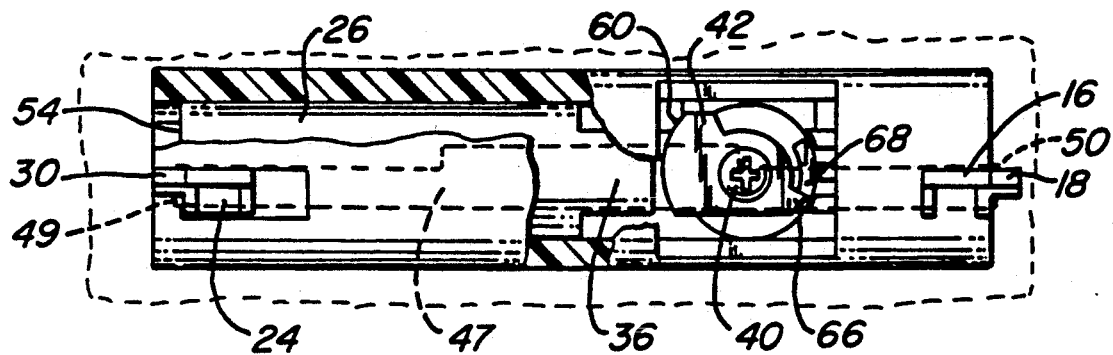
FIG. 2B is a view similar to that of FIG. 2A with the embodiment of FIG. 1 shown in the locked position.

Embodiment 10 is illustrated in more detail by way of reference to FIGS. 2A and 2B. Housing 12 includes a cylindrical piston chamber 52 in which the cylindrical piston 26 is located. Piston 26 has a closed end 54, which can be pressed by the user through the open end 14 of housing 12. Piston 26 also has an opposite open end 56, and the piston itself is hollow. Piston 26 is biased outwardly by a cylindrical spring 58 located within the hollow interior of the piston and extending from its closed end 54 to an abutment 59 formed in housing 12 between the piston chamber 52 and locking chamber 38.

Hasp 42 has a complex configuration including a curved surface 60 at the terminus of its long dimension, and a flat surface 62 at the terminus of its short dimension. In FIG. 2A, hasp 42 is in its unlocked configuration, with its short dimension aligned with piston 26, so that flat surface 62 is oriented toward extension 36 of the piston. This allows the user to press inwardly on the end of piston 54, moving latch member 24 inwardly so that movable latch member 24 together with fixed latch member 16 can be inserted into a disk drive slot 47 between the corners 49, 50 thereof.

As illustrated in FIG. 2B, release of pressure on the end 54 of piston 26 allows the piston to move outwardly, biased by spring 58. In this position, hasp 42 can be rotated 90° so that its long dimension is aligned with piston 26 with curved surface 60 proximate piston extension 36. Further rotation of hasp 42 is prevented by the engagement of a boss 66 on hasp 42 with projection 68 on locking mechanism 40. In this configuration, piston 26 is locked in position, with the lips 18, 30 of latch members 16, 24 extending beyond the ends 49, 50 of slot 47.

Figure 3:
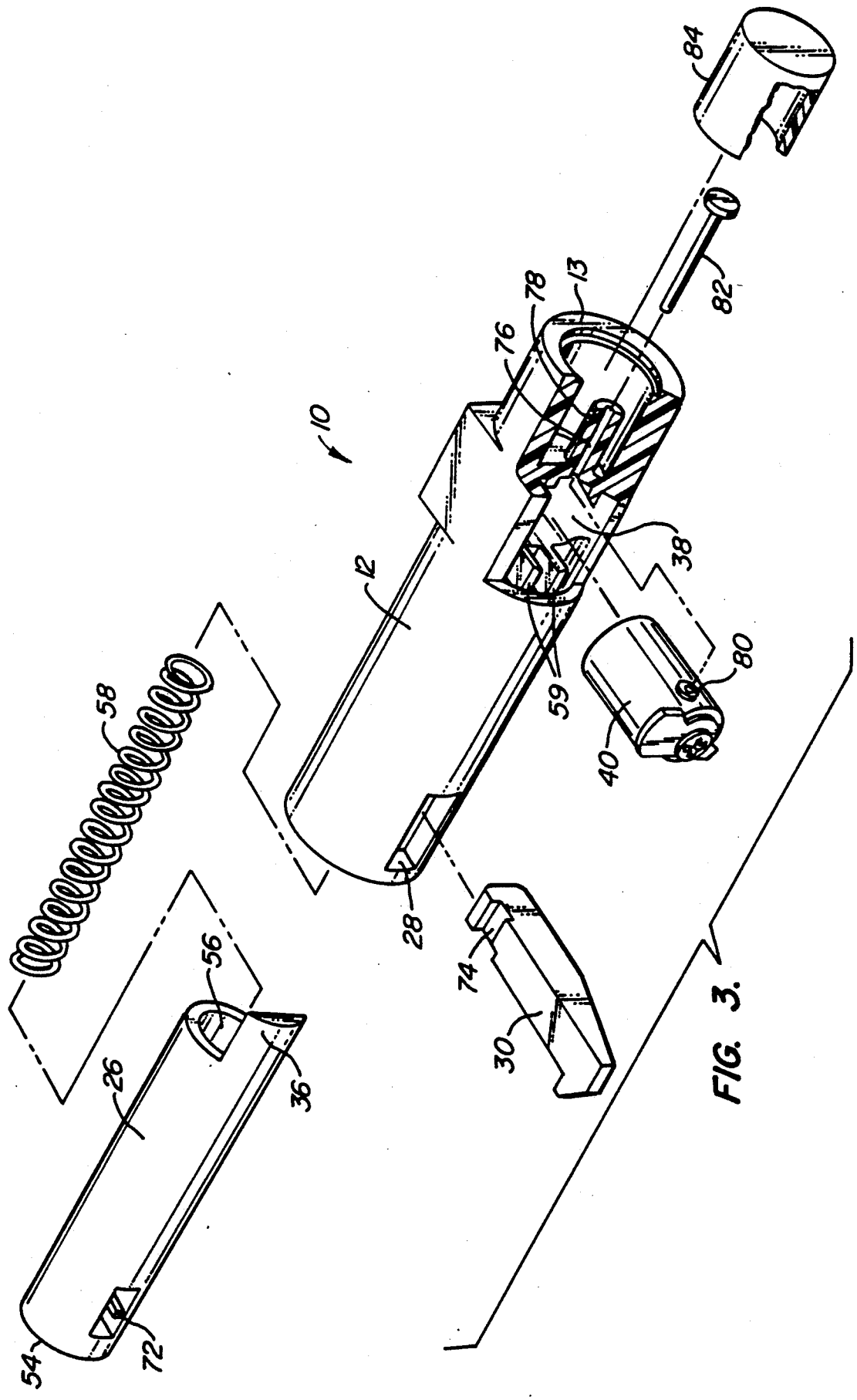
FIG. 3 is an exploded view of the embodiment of FIG. 1.

The components of preferred embodiment 10 are illustrated in more detail in the exploded view of FIG. 3. Housing 12 is preferably constructed of a plastic molded material. Abutments 59 partially span the width of the interior of housing 12 between the piston chamber (not visible) and the lock receiving chamber 38. The extension 36 of piston 26 overlies abutments 59 so that the extension projects partially into lock receiving chamber 38. Piston 26 is generally hollow, and has a fitting 72 near its closed end 54 adapted to meet with and engage a recess 74 in the base of piston latch member 30. Cylindrical spring 58 fits within the hollow interior 56 of piston 26. The piston side of the device is assembled by placing spring 58 into the hollow interior of piston 26, inserting piston 26 into the hollow interior of housing 12, and inserting piston latch member 30 through radial opening 28 so that recess 74 engages complementary fitting 72 to rigidly attach the latch member to the piston. In this configuration, movable latch member 30 prevents the removal of piston 26.

Open end 13 of housing 12 provides access to a narrow cylindrical bore 76 in a projection 78 formed in the housing. Lock mechanism 40 has a small ring 80 attached to one side having a recess in the center. Lock mechanism 40 is inserted into the lock receiving chamber 38 in housing 12, and is secured in position by a pin 82 inserted through the open end 13 of the housing, through bore 76 into engagement with the center of ring 80. Pin 82 is held in position by friction with the surface of bore 76. After pin 82 has been inserted in the bore to secure lock mechanism 40 in position, a cap 84 is frictionally engaged with the interior of housing 12 at its open end 13 to complete the assembly.

In operation, removable key 46 is used to rotate elongate hasp 42 so that its short dimension is aligned with piston 26. This allows the piston to be moved inwardly, by the user pushing on the closed end 54 of the piston, by the angled surface 34 of the lip 30 of latch member 24 engaging the end of the slot, or a combination of the two. This position of hasp 42 allows lips 18, 30 of latch members 16, 24 to be inserted into a disk drive slot 47. Thereafter, key 46 is rotated 90° to rotate hasp 42 so that its long dimension is lined with piston 26. Inward movement of piston 26 is effectively prevented, locking housing 12 in engagement with disk drive slot 47. In this configuration, the surface of housing 12 between latch members 16, 24 overlies slot 47 and prevents access to the disk drive.

While a preferred embodiment of the present invention has been illustrated in detail, modifications and adaptations of that embodiment may occur to those skilled in the art. However, it is to be expressly understood that such modifications and adaptations are within the spirit and scope of the present invention, as set forth in the following claims.

What is claimed is:

1. Apparatus for preventing unwanted access to a disk drive having a slot for the insertion of a computer disk, said apparatus comprising:

an elongate housing having a piston end and a fixed end and a surface between the ends adapted to overlie the slot to prevent access to the disk drive, said housing including a piston chamber extending inwardly from said piston end of the housing and a lock receiving chamber intersecting the piston chamber intermediate the ends of the housing;

a fixed latch member attached to the housing proximate the fixed end of said housing and projecting from the housing in a direction generally perpendicular to a longitudinal axis of the housing, said fixed latch member having a lip at its distal end extending away from said housing in a direction generally parallel to the axis of the housing;

a piston located in the piston chamber and including a lock engaging end proximate the lock receiving chamber and a remote end proximate the piston end of the housing;

a moveable latch member attached to the remote end of the piston and projecting outwardly with respect to the housing in a direction generally parallel to the fixed latch member, said moveable latch member having a lip at its distal end extending laterally and away from said housing so that the lips on the respective latch members extend away from one another, said piston being moveable inwardly with respect to the housing so that the latch members can be inserted into the disk drive slot and positioned so that the lips of the latch members engage the inside corners of the slot; and lock means located in the lock receiving chamber of the housing and having a hasp moveable from an unlocking position out of engagement with the lock engaging end of the piston so that the latch members can be engaged with and disengaged from the slot, and a locking position in engagement with the lock engaging end of the piston to prevent inward movement of the piston and thus lock the latch members in engagement with the slot.

2. Apparatus as recited in claim 1 wherein the housing has a cylindrical cross-section, and the piston and the piston chamber have mating cylindrical cross-sections.

3. Apparatus as recited in claim 1 wherein the housing has a radial aperture proximate the piston end of the housing, and wherein the moveable latch member projects through the aperture.

4. Apparatus as recited in claim 1 and additionally comprising bias means within the housing biasing the piston toward the piston end of the housing.

5. Apparatus as recited in claim 4 wherein the housing has an opening at its piston end to expose the remote end of the piston so that the piston can be moved inwardly by an user to insert the latch members into the slot when the lock means is in its unlocking position.

6. Apparatus as recited in claim 5 wherein the piston has a hollow interior and a cylindrical configuration closed at its remote end and open at its lock engaging end, and wherein the bias means comprises a spring located in the interior of the piston.

7. Apparatus as recited in claim 6 wherein the housing has an abutment located between the piston chamber and the lock receiving chamber, and wherein an end of the spring engages the abutment.

8. Apparatus as recited in claim 7 wherein the lock engaging end of the piston includes an extension extending alongside and past the abutment into the lock receiving chamber.

9. Apparatus as recited in claim 1 wherein the hasp is elongate and rotatable through an arc of about 90 degrees so that the long dimension of the hasp is aligned with the piston in the locking position of the hasp and the short dimension of the hasp is aligned with the piston in the unlocking position of the hasp.

10. Apparatus as recited in claim 1 wherein the fixed end of the housing has an opening, and additionally comprising means insertable through the opening at the fixed end of the housing for securing the lock means in the lock receiving chamber.

11. Apparatus as recited in claim 10 and additionally comprising a cap covering the opening at the fixed end of the housing after insertion of the lock securing means.

12. Apparatus for preventing unwanted access to a disk drive having a slot for the insertion of a computer disk, said apparatus comprising:

a cylindrical, axially elongate housing having an open piston end and a fixed end and a surface extending between said ends adapted to overlie the disk drive slot and prevent access thereto, said housing including a cylindrical piston chamber extending inwardly from the open piston end of the housing and having a radial aperture proximate the piston end of the housing, a lock receiving chamber, and an abutment intermediate the piston chamber and the lock receiving chamber;

a fixed latch member attached to the housing proximate the fixed end of said housing and projecting from the housing in a direction generally perpendicular to a longitudinal axis of the housing, said fixed latch member having a lip at its distal end extending away from said housing in a direction generally parallel to the axis of the housing;

a hollow cylindrical piston located in the piston chamber and having a lock engaging end including an extension projecting past the abutment and a closed distal end proximate the open piston end of the housing;

a spring located in the hollow interior of the piston in engagement with the abutment to bias the piston toward the piston end of the housing;

a moveable latch member attached to the remote end of the piston and projecting outwardly with respect to the housing through the aperture in a direction generally parallel to the fixed latch member, said moveable latch member having a lip at its distal end extending laterally and away from said housing so that the lips on the respective latch members extend away from one another, said piston being moveable inwardly with respect to the housing so that the latch members can be inserted into a disk drive slot and thereafter moveable outwardly so that the lips of the latch members engage the inside edges of the slot; and lock means located in the lock receiving chamber of the housing and having an elongate hasp rotatable between an unlocking position in which the short dimension of the hasp is aligned with the extension of the piston so that the latch members can be engaged with and disengaged from the slot, and a locking position in which the long dimension of the hasp is aligned with the extension of the piston to prevent inward movement of the piston so that the latch members are locked in engagement with the slot.

13. Apparatus as recited in claim 12 wherein the lock receiving chamber is oriented perpendicular to the piston chamber, and the axis of rotation of the hasp is perpendicular to the direction of movement of the piston 14. Apparatus as recited in claim 13 wherein the housing has an open fixed end, and additionally comprising means insertable through the fixed end of the housing for securing the lock means and a cap blocking the open fixed end of the housing after insertion of the lock securing means.

* * * * *